United States Patent Office 3,209,050
Patented Sept. 28, 1965

3,209,050
PURIFICATION OF DIOLEFINS
Edward S. Hanson, Akron, Ohio, assignor to The Firestone Tire & Rubber Company, Akron, Ohio, a corporation of Ohio
No Drawing. Filed May 19, 1961, Ser. No. 111,152
13 Claims. (Cl. 260—681.5)

This invention relates to a method for purifying diene monomers and more particularly to a method for treating isoprene, butadiene and piperylene containing alpha-acetylenes to provide a purified monomer particularly suitable for polymerization to produce high 1,4 linear polymers.

Diene monomers such as isoprene, butadiene-1,3 and piperylene are derived primarily from naturally occurring mixtures of hydrocarbons such as those found in petroleum and oil shale by thermal or catalytic cracking, dehydrogenation and analogous processes, followed by fractionation. Isoprene, butadiene and piperylene produced by such refining procedures contain small amounts of impurities, usually ranging up to about 4% by weight. The impurities present in isoprene produced by conventional refining processes include alpha-acetylenes, of which isopropenyl acetylene is the most predominant, and cyclopentadiene.

It is known to produce polymeric conjugated dienes of relatively high 1,4 content through utilization of lithium-dependent and coordination or Ziegler type catalysts. Such catalysts also polymerize slightly impure isoprene, butadiene and piperylene, but when certain impurities, such as alpha-acetylenes and cyclopentadiene, are present, polymerization does not occur until the catalyst level is increased to many times that required when such impurities are absent. Conventional, commercially available isoprene, butadiene and piperylene usually contain small amounts of isopropenyl acetylene, other alpha-acetylenes, and cyclopentadiene, and hence are not satisfactory for the production of high 1,4 polymers.

Methods are available for removing cyclopentadiene from impure isoprene, butadiene and piperylene. Conventionally employed methods involve fractionation under carefully controlled conditions or treatment with maleic anhydride followed by distillation of the resulting mixture to recover the pure monomers. Such methods for removing cyclopentadiene are ineffective to remove alpha-acetylenes from impure isoprene, butadiene and piperylene.

The separation of some impurities from slightly impure isoprene, butadiene and piperylene may be effected by passage through synthetic metal-alumino silicates having a three-dimensional crystal structure known as molecular sieves, which have channel diameters of five Angstrom units. U.S. Patent No. 2,900,430 to Henke et al. describes a process which is representative of prior art isoprene purification processes employing such molecular sieves. The primary object in employing five Angstrom molecular sieves in these processes is to remove 2-butyne, a straight-chain acetylene, from isoprene to render the purified isoprene suitable for polymerization with trialkyl aluminum-titanium tetrachloride catalysts, to which 2-butyne acts as a powerful inhibitor.

Accordingly, it is the primary object of the present invention to provide a method for treating isoprene, butadiene and piperylene containing small amounts of polymerization inhibitors to render such monomers especially suitable for polymerization by lithium-dependent or coordination catalysts to produce high 1,4 polymers.

It is another object of the present invention to provide a method for treating isoprene, butadiene and piperylene containing small amounts of polymerization inhibitors to render such dienes satisfactory for polymerization by relatively small amounts of lithium-dependent catalysts.

It is an additional object of the present invention to provide a method for treating isoprene, butadiene and piperylene to remove small amounts of polymerization inhibitors to render such monomers capable of polymerization by lithium-dependent catalysts at a catalyst level comparable to that required to polymerize pure isoprene.

It is a further object of the present invention to provide a method for treating slightly impure isoprene, butadiene and piperylene containing alpha-acetylenes to remove therefrom the alpha-acetylenes and other compounds which inhibit polymerization to high 1,4 polymers.

It is still another object of the present invention to provide a method which entails no significant isoprene loss for the selective removal of alpha-acetylenes from isoprene.

It is still an additional object of the present invention to provide a physical method for the selective removal of alpha-acetylenes from isoprene whereby losses due to polymerization of isoprene characteristic of chemical purification processes are essentially eliminated.

In accordance with this invention an alpha-acetylene containing monomer selected from the group consisting of isoprene, butadiene and piperylene is passed through a bed of molecular sieves having channels therein of a substantially uniform diameter of at least about seven Angstrom units to selectively adsorb said alpha-acetylenes. The monomer may be purified in accordance with the invention in either gas or liquid phase. Purification as a liquid under anhydrous conditions is preferred.

Slightly impure isoprene, butadiene or piperylene treated in accordance with the method of the present invention are sufficiently reduced in alpha-acetylene content for satisfactory polymerization by relatively small amounts of lithium-dependent catalysts or coordination catalysts. The catalyst levels required to effect the polymerization are comparable to those required for the pure monomers. The polymers formed therefrom are characterized by a relatively high content of 1,4-structure.

Molecular sieves are synthetic metal-alumino silicates having a three-dimensional crystal structure. As synthesized, the crystals contain water of hydration which can be driven out by heating to a sufficiently high temperature without collapsing the crystal lattice. Physically, molecular sieves are white powders with particles ranging from one to three microns in diameter. They are chemically inert in the presence of most compounds except strong acids. Each particle of molecular sieve powder is a single crystal which contains literally billions of tiny cavities or cages interconnected by channels of unvarying diameter. The size and position of the metal ions in the crystal control the effective diameter of the interconnecting channels. The combined effect of the uniformly small channel size and the strong surface forces, which distinguish molecular sieves from all other adsorbents, essentially isolates the compounds caged within the crystal lattice. The compound will remain confined until released by heat or by displacement with another adsorbable material.

The molecular sieves contemplated for utilization in the method of the present invention are synthetic metal alumino silicates, commonly known as zeolites, characterized by a three-dimensional molecular structure having channels therein of a substantially uniform diameter of at least about seven Angstrom units capable of adsorbing alpha-acetylenes. Such metal alumino silicates preferably contain channels having a diameter in the range of from about seven to about sixteen, optimally from about eight to about fourteen, Angstrom units. The synthetic metal alumino silicates having channels of a diameter in the above-stated range are characterized by the ability to adsorb alpha-acetylenes while allowing the passage of isoprene, butadiene or piperylene therethrough. Similar molecular sieves characterized by having channel diameters of below about seven Angstrom units are not sufficiently effective to provide a suitable separation between isoprene, butadiene or piperylene and alpha-acetylenes. This result occurs even though the channel diameters are of such a size that the passage of alpha-acetylenes therethrough is obstructed while the passage of the diene monomer is not. The failure of molecular sieves having channel diameters of less than about seven Angstrom units, therefore, is probably due to the fact that the channels are too small for alpha-acetylene molecules to pass and reach the internal structure of the adsorbent wherein such molecules might be trapped and effectively adsorbed. Molecular sieves having channel diameters greater than about sixteen Angstrom units are ineffective to adsorb alpha-aceylenes as well as dienes and, therefore, are not suitably adapted for the purpose of the invention.

Specific molecular sieves suitable for utilization in the method of the present invention are the commercially available synthetic zeolites designated as 13–X Molecular Sieves manufactured by the Linde Air Products Company. Such molecular sieves are metal alumino silicates characterized by a crystal lattice containing channels having a diameter of about ten Angstrom units, as disclosed on page one of a pamphlet of the Linde Company entitled "Chemical Loaded Molecular Sieves," Form Number F1311, published in July 1959. The chemical structure of Type X molecular sieves is shown in R. M. Milton U.S. Patent 2,882,244 to be a metal alumino silicate of the zeolite type.

The molecular sieves contemplated for use in the method of the present invention may be of any suitable particle size. For small scale treatments of isoprene, butadiene or piperylene, wherein a suitable amount of molecular sieves is simply stirred into the monomer sample, molecular sieve powders having an average particle size of from about 0.5 to five microns are preferred. For large scale commercial operations, molecular sieve pellets having diameters in the range of from about 0.05 to about 0.15 inch are preferred.

The isoprenes, butadienes and piperylenes most suitable for treatment in the method of the present invention are relatively pure, preferably having a purity of at least about 99% by weight, and primarily contain alpha-acetylenes as impurities. Isoprenes, butadienes and piperylenes preferably adapted for treatment by the method of the invention contain alpha-acetylenes in amounts ranging up to about 0.1% by weight. Commercially available isoprenes, butadienes and piperylenes usually contain a small amount, up to about 0.02% by weight, of relatively high molecular weight stabilizers. Such stabilizers, of which tert.-butyl catechol is an example, are effective to inhibit polymerization during storage and the formation of undesirable substances, such as peroxides, aldehydes and other carbonyls. These undesirable substances, however, are present at least to some extent even in diene monomers containing conventionally employed amounts of inhibitors. The presence of such inhibitors, in diene monomers treated in accordance with the present invention seriously reduces the capacity of the molecular sieves employed for alpha-acetylene removal. Accordingly, such substances are preferably removed prior to treatment of the diene monomer by the method of the invention. Such removal may be accomplished by any suitable method, preferably by a distillation of the impure isoprenes wherein substances having a boiling point greater than about 40° C. are essentially removed. Since cyclopentadiene has a boiling point of about 43° C., such a distillation generally is effective also to remove at least a portion of any cyclopentadiene impurity from isoprene, butadiene and piperylene.

Simple distillation, however, generally is ineffective to completely remove cyclopentadiene from isoprene, butadiene and piperylene. More complete cyclopentadiene removal may be effected by any suitable process conventionally employed for such purposes, such as carefully controlled fractionation, or treatment with maleic anhydride.

In addition, isoprenes, butadienes and piperylenes usually contain small amounts of absorbed moisture. The presence of moisture in the diene monomers treated in accordance with the present invention reduces the capacity of the molecular sieves with respect to alpha-acetylenes. Accordingly, prior to treatment by the method of the present invention, the diene monomers are preferably specially treated for moisture removal. Moisture removal can be accomplished by passing the monomer through a bed of moisture-adsorbing material. Suitable moisture-adsorbing materials include silica gel, activated alumina, and molecular sieves having a channel diameter of less than about seven Angstrom units. Activated alumina is the more preferred adsorbent for effecting the desired moisture removal.

In the method of the present invention relatively pure isoprene, butadiene or piperylene preferably is initially subjected to a moisture removal treatment and, when desired, to one or more additional treatments to remove any of the other undesirable impurities present. As stated above, a pretreatment to remove any dimers and/or inhibitors present is especially desirable. The pretreated diene monomer, preferably in liquid form, then immediately is contacted under anhydrous conditions with suitable molecular sieves which previously have been activated and freed of moisture to effect selective adsorption of the alpha-acetylenes by the molecular sieves.

When the method of the invention is employed as a batch-wise treatment of diene monomers, the contact between the molecular sieves and monomer is accomplished by adding either the adsorbent to the monomer or monomer to the adsorbent. If the monomer is processed as a liquid, the resulting suspension is stirred for a time requisite for the alpha-acetylene content of the monomer to be lowered to the desired value. Of course, the specific amount of adsorbent and contact time required to accomplish the desired alpha-acetylene adsorption will vary from one treatment to another depending upon the initial and desired final, purity of the monomer, and the particular molecular sieves employed. For isoprene contemplated to be polymerized by lithium-dependent or co-ordination type catalysts, the maximum allowable alpha-acetylene concentration is about 0.01% by weight isoprene. The amount of molecular sieves which may be satisfactorily employed to reduce the alpha-acetylene content of an impure isoprene, butadiene or piperylene to a value of about 0.01% by weight is in the range of from about 0.6 to about 2.0, preferably from about 0.8 to about 1.5, volumes molecular sieves per each 0.01% by weight alpha-acetylenes present in the impure isoprene.

When the method of the present invention is employed in a continuous process, the desired contact between the impure monomer and the molecular sieves is accomplished by passing a stream, preferably liquid under anhydrous conditions, through a bed of activated molecular sieves. Sufficient pressure is applied to the monomer stream to provide a space velocity through the bed in the range of from about 0.2 to about 12, preferably from about 0.4 to about 8, volumes of impure monomer per volume of molecular sieves per hour. Monomer obtained as an effluent from the bed may be passed to another bed or recycled to the same bed for further treatment. Passage of monomer through a particular bed of molecular sieves is continued until the adsorbent in the bed is substantially saturated with respect to alpha-acetylenes. This bed saturation point is reached when a monomer effluent is provided by the bed which is characterized by an alpha-acetylene content of the maximum allowable in the use for which the effluent is intended. When the adsorbent bed reaches the saturation point with respect to a desired effluent, the isoprene feed to the bed is discontinued, and the bed is regenerated for reuse. Several molecular sieve beds may be connected in series and/or parallel. In such an arrangement when one bed requires regeneration, it simply may be cut out of the system, and the isoprene treatment is allowed to proceed in a continuous manner.

The molecular sieves employed to effect the separation of diene monomers and alpha-acetylenes when fresh or after regeneration may be activated and treated for moisture removal by any suitable method. In a method preferably employed for activating the synthetic metal-alumino silicates, the adsorbent silicates are confined in a system maintained under a nitrogen purge and subjected to a treatment wherein they are initially heated at a temperature in the range of from about 350° to about 400° F. and then cooled to ambient temperatures. Preferably the molecular sieves are activated in place in the bed in which they are to be employed.

When liquid isoprene, butadine or piperylene is contacted with dry, activated molecular sieves, substantial heating of the monomer, sometimes reaching 350° C. to 40° C., occurs to the wetting of the dry adsorbent by the liquid, and a slight amount of polydiene may form in the adsorbent. Although the amount of polydiene which is formed is negligible when considered on a single run basis, a buildup of polydiene in the adsorbent bed over successive runs results in an undesirable loss of adsorbent capacity and renders regeneration of the adsorbent material highly difficult. Regeneration of such contaminated molecular sieves requires elaborate equimpent employing relatively high temperatures which, even when carefully controlled, may result in destruction of the absorbent.

The heat of wetting on contact or isoprene with fresh adsorbent can be reduced by feeding it as dilute vapor, for example, mixed with an inert gas such as nitrogen. However, a more convenient method is to pre-wet the adsorbents with inert liquids which would not contaminate the monomer subsequently treated.

Accordingly, it is preferred that the molecular sieves be pre-wetted with pure, moisture-free, non-polymerizable compounds which whe present in the fiinal pure monomer effluent are not detrimental. In case of isoprene intended for polymerization by lithium-dependent catalysts, compounds especially suitable for use in the pre-wetting step include hydrocarbons employed as solvents in the polymerization system. Hydrocarbons suitable for such include any of the pentanes, hexanes, heptanes, and mixtures thereof. By the use of a pre-wetting step, the adsorbent is placed in such a condition that when contacted with liquid isoprene, the isoprene is heated only slightly and polyisoprene formation essentially is avoided.

The pre-wetting treatment, when employed, may be accomplished by any suitable method and is preferably carried out by passing previously dried wetting liquid through the bed of molecular sieves, followed by blowing out the excess liquid.

The regeneration of molecular sieves substantially saturated with respect to alpha-acetylenes may be carried out by any suitable method for accomplishing this purpose. One method suitable for utilization in the method of the present invention involves initially evacuating the saturated molecular sieves and finally heating the adsorbent at a temperature in the range of from about 900° to about 950° F. in a nitrogen-air mixture having a volume ratio of nitrogen to air of about 4:1. This method is described in greater detail in U.S. Patent No. 2,900,430. With this method, however, careful control of the temperature is required to avoid forming polymers in the adsorbent and destroying the crystals of the adsorbent.

In another method, which constitutes the preferred method for regenerating the saturated molecular sieves, the desired regeneration is carried out by a method which comprises contacting the saturated molecular sieves with a polar compound having the ability to act as a solvent for unsaturated materials adsorbed in the molecular sieves to displace the unsaturated materials therefrom. The polar solvents which are preferred for utilizations are those which are readily separable from hydrocarbons containing 4 and 5 carbon atoms. The more preferred polar solvent is methanol. In a preferred embodiment of such a regeneration treatment saturated molecular sieves are initially purged with nitrogen to remove as much free liquid as possible. Following the nitrogen purge, the molecular sieves are subjected to an immersion in a suitable polar solvent and allowed to remain therein for a period requisite for essentially all of the adsorbed unsaturated material to be displaced by the polar solvent. A period satisfactory for effecting the desired displacement is usually at least about 50, preferably at least about 60, hours. More preferably, the treatment is carried out in several steps. In one treatment, saturated molecular sieves are immersed in a suitable polar solvent and allowed to remain therein for a period in the range of from about 6 to about 10, preferably from about 7 to about 9, hours. At the end of this period the polar solvent is removed from the adsorbent, preferably by draining and blowing with an inert gas, such as nitrogen, and the adsorbent again is immersed in fresh solvent. The second solvent supply is allowed to remain in contact with the molecular sieves for a period of at least about 45, preferably about 55, hours after which time it is removed, preferably by draining and blowing, to provide molecular sieves essentially free of contaminating substances.

Following the renegeration treatment, the adsorbent material is activated, as described above, and made ready to be reused in the process.

An embodiment of the method of the present invention wherein a pre-wetting step and a regeneration step using a polar solvent are employed in combination provides the preferred embodiment of the method of the present invention for removing alpha-acetylenes from isoprene, butadiene, and piperylene.

When combined with a treatment to remove cyclopentadienes, the treatment of the present invention for removal of alpha-acetylenes in impure isoprene, butadiene and piperylene provides monomers of the requisite purity to be polymerized by catalyst levels of lithium-containing catalysts in the range of from about 0.00002 to about 0.1 part catalyst per 100 parts monomer to yield valuable stereospecific polymers. Lithium-dependent catalysts which are suitable for effecting the desired polymerization of isoprene treated in accordance with the present method include any such catalyst useful in isoprene polymerizations. Such lithium-dependent catalysts include the hydrocarbon-lithium compounds containing at least one lithium atom to which is attached hydrocarbon radicals selected from the group consisting of alkyl radicals, such as propyl, butyl, amyl, hexyl, heptyl, and octyl groups; alkenyl radicals, such as ethylene, trimethylene, and tetramethylene groups; cycloaliphatic radicals, such as cyclohexyl and cyclohexenyl groups; and aryl radicals, such as benzyl, tolyl, and xylyl groups. Other catalysts and specific examples of the above-described types of lithium catalysts may be found in British Patent No. 813,198. "Co-ordination" or Ziegler-type catalysts are well known to the art and generally are formed from a heavy metal compound such as titanium tetrachloride and a reducing agent such at triethyl aluminum.

When it is not contemplated to utilize isoprene, butadiene or piperylene purified by the present invention immediately, a small amount of a substance, such as tert.-butyl catechol, should be incorporated therein to inhibit the formation of undesirable substances, such as polymers, aldehydes and other carbonyls therein during storage.

The invention having been generally described, the following examples are given to specifically illustrate various embodiments of the method of the invention. The examples are given for illustration purposes only and are not intended in any way to limit the scope of the invention. All parts are by weight unless otherwise indicated.

EXAMPLE I

Impure isoprene containing about 0.065% by weight alpha-acetylenes, about 0.16% by weight 2-butyne, and about 0.02% by weight inhibitor (tert.-butyl catchol) was initially distilled to remove heavy constituents with the collection of distillate being discontinued when about 98% by weight of the isoprene had been distilled over. The freshly distilled isoprene was then charged to a vertical glass treating column one inch in diameter by 26 inches high surmounted by a one-liter flask, and fitted with a stopcock at the bottom, and containing about 250 cc. of 13-X Molecular Sieves in the form of $1/16"$ pellets. The temperature of the isoprene before charging was about 0° C., but it rapidly reached room temperature upon initial contact with the dry molecular sieves. Treated isoprene was removed from the bottom of the column at a rate of about two cc. per minute. The effluent from the system was checked at intervals to determine the purity thereof. The results of these tests are shown in Table I. Approximately the final 100 cc. of isoprene in each increment was analyzed for alpha-acetylenes.

*Table I*

| Total isoprene throughput, cc.: | Alpha-acetylene in effluent percent by weight |
|---|---|
| 100 | Discarded |
| 300 | 0.004 |
| 700 | 0.021 |

In similar tests with other adsorbents, silica gel gave an effluent containing 0.043% alpha-acetylenes, compared to 0.065% in the feed. 5-A Molecular Sieves from Linde Air Products Company gave an effluent containing 0.065% alpha-acetylenes; hence there was no removal of these impurities by this adsorbent.

EXAMPLE II

A test was carried out in a flow-type apparatus with exclusion of air and moisture. The apparatus consisted of two steel pipes 1.5 inches in inside diameter and 9 inches long fitted with heaters. The first column contained 270 ml. of activated alumina and the second contained 270 ml. of Linde Air Products Company Type 13-X Molecular Sieves in the form of $1/16$ inch cylindrical pellets. The material in both columns was freed of moisture and air before use by heating in place to about 180–200° C. with a purge of lamp-grade nitrogen. After the adsorbents had cooled to room temperature a mixture of nitrogen and isoprene vapor was passed through the system for several hours. Isoprene to be treated, from the same lot as that used in Experiment I, and prepared by distillation in the same manner as used therein, was pressured through the two columns connected in series at a rate of about two cc. per minute, resulting in a space velocity through the molecular sieve column of about 0.45 volume isoprene per volume molecular sieves per hour. A temperature rise of 9° C. was observed on initial contacting of the liquid isoprene with the molecular sieves, this temperature being measured on the metal column. The results of tests on the effluent obtained are shown in Table II.

*Table II*

| Total Isoprene Throughput, cc. | Effluent | |
|---|---|---|
| | Alpha-acetylenes, percent by Weight | 2-Butyne, percent by Weight |
| 45 | 0.002 | |
| 715 | 0.003 | |
| 1215 | 0.006 | 0.04 |
| 1715 | 0.009 | |
| 2205 | 0.017 | 0.13 |

EXAMPLE III

The molecular sieves resulting from the isoprene feed therethrough described in Example II and substantially saturated with respect to alpha-acetylenes were drained to remove all isoprene and purged with nitrogen at ambient temperatures. The molecular sieves then initially were evacuated, then contacted at about 60–80° C. with nitrogen saturated with water vapor, and finally purged with a nitrogen-steam mixture until liquid water issued from the adsorber. After purging the system with additional nitrogen to remove free water, the molecular sieves were heated to 180–200° C. with hot nitrogen purge and then recooled to ambient temperatures. The thus activated molecular sieves then were wet with isoprene by passing therethrough a mixture of nitrogen and isoprene vapor at about 0° C.

The procedure of Example II was repeated for treating an isoprene from the same lot as used in Example I and prepared by distillation in the same manner as described therein. The results of the isoprene effluents obtained are set forth in Table III.

*Table III*

| Total Isoprene Throughput, cc. | Effluent | |
|---|---|---|
| | Alpha-acetylenes, Percent by Weight | 2-Butyne, Percent by Weight |
| 310 | 0.016 | 0.03 |
| 1,220 | 0.025 | 0.13 |

This experiment demonstrates that displacement of unsaturated compounds from the adsorbent by water was ineffective.

EXAMPLE IV

The procedure of Example III was repeated, except that methanol was used instead of water vapor for purging. The two adsorbent vessels containing the adsorbents from Experiment III were filled with liquid methanol. After standing overnight this was blown out, and the system refilled with fresh methanol and blown out immediately. After evacuation at room temperature for one-half hour the alumina and molecular sieves were heated with nitrogen purge as previously described. The results of the tests in the isoprene effluent are given in Table IV.

*Table IV*

| Total isoprene throughput, cc.: | Alpha-acetylenes in effluent, percent by weight |
|---|---|
| 300 | 0.009 |
| 1350 | 0.024 |
| 2290 | 0.041 |

EXAMPLE V

The procedure of Example IV was repeated on the adsorbents from Experiment IV, except that instead of allowing the first methanol wash to stand in contact with the adsorbents overnight it was slowly circulated through the system by pouring back into the system the overflow (320 cc.) from addition of 1000 cc. of methanol to the system. This was repeated ten times over a one-half hour period, followed by blowing out and pouring in fresh methanol (as in Example IV) which was allowed to stand in the system one-half hour and then blown out. After the usual evacuation, heating, cooling, and pre-wetting isoprene from the same lot as in Experiment I was treated, with results given in Table V.

Table V

| Total isoprene throughput, cc.: | Alpha-acetylenes in effluent, percent by weight |
|---|---|
| 300 | 0.015 |
| 1350 | 0.029 |

EXAMPLE VI

The apparatus described in Experiment II was charged with fresh alumina and 13–X Molecular Sieves, and heated while purging as described therein. These materials were then pre-wet by passing through the system liquid hexane previously purified by washing with concentrated $H_2SO_4$. The results of tests on the isoprene effluent obtained are set forth in Table VI.

Table VI

| Total isoprene throughput, cc.: | Alpha-acetylenes in effluent, percent by weight |
|---|---|
| 340 | 0.0026 |
| 1350 | 0.0029 |
| 1760 | 0.0065 |
| 2400 | 0.014 |

EXAMPLE VII

The alumina and molecular sieves from Experiment VI were treated as follows: The system was filled with liquid methanol and allowed to stand 8 hours. This methanol was blown out and the system refilled with methanol and allowed to stand 60 hours. The methanol was blown out and the system evacuated at room temperature for one-half hour. The adsorbents were then heated to 180–200° C. with a nitrogen purge, and allowed to cool to ambient temperature, with nitrogen purge maintained. After pre-wetting with liquid hexane as in Example VI impure isoprene of the same lot as used in Example I was treated, with results given in Table VII.

Table VII

| Total isoprene throughput, cc.: | Alpha-acetylenes in effluent, percent by weight |
|---|---|
| 420 | 0.0026 |
| 1480 | 0.008 |
| 2180 | 0.010 |

EXAMPLE VIII

The regeneration procedure of Example VII was carried out on the adsorbents used in that example, followed by pre-wetting with hexane and treating of isoprene. Similarly good acetylene removal resulted, and results of the three cycles (Examples VI, VII and VIII) are summarized in Table VIII, which shows that the molecular sieves maintained their original capacity for acetylene removal after regeneration and pre-wetting by this preferred procedure.

Table VIII

| Cycle | Alpha-acetylenes in First 300 cc. throughput, percent by Weight | Total Isoprene Throughput to 0.01% alpha-acetylene effluent, cc. |
|---|---|---|
| 1 | 0.0026 | 2,070 |
| 2 | 0.0026 | 2,180 |
| 3 | 0.0013 | 2,200 |

I claim:
1. A method of removing alpha-acetylene impurities from a material selected from the group consisting of isoprene, butadiene and piperylene, comprising contacting said material under anhydrous conditions with type 13–X molecular sieves having channels of a substantially uniform diameter of approximately 10 Angstrom units to selectively adsorb said alpha-acetylenes from said material, continuing contacting said material with said molecular sieves until the latter become substantially saturated with respect to said alpha-acetylene impurities, thereafter discontinuing contact of said material with said sieves, and then regenerating said sieves for future use.
2. The method according to claim 1 wherein said contacting is carried out by passing said material in a stream through a bed of said molecular sieves.
3. The method according to claim 2 wherein said material stream is passed through said bed of molecular sieves at a space velocity in the range of from about 0.2 to about 12 volumes impure material per volume molecular sieves per hour.
4. The method according to claim 3 wherein said space velocity is in the range of from about 0.4 to about 8.0 volumes impure material per volume molecular sieves per hour.
5. The method according to claim 4 wherein the said molecular sieves are wet with a non-polymerizable hydrocarbon prior to the passage of said material therethrough.
6. The method according to claim 5 wherein said non-polymerizable hydrocarbon is selected from the group consisting of pentanes, hexanes, heptanes, and mixtures thereof.
7. The method according to claim 1 wherein said regeneration comprises displacing adsorbed unsaturated compounds in said molecular sieves with a polar compound capable of acting as a solvent for said unsaturated compounds, followed by heating and purging.
8. The method according to claim 7 wherein the said polar solvent is methanol.
9. The method according to claim 1 wherein said material is isoprene.
10. The method according to claim 1 wherein said material is butadiene.
11. The method according to claim 1 wherein said material is contacted as a liquid with said molecular sieves.
12. The method according to claim 11 wherein said material is isoprene.
13. The method according to claim 11 wherein said material is butadiene.

References Cited by the Examiner
UNITED STATES PATENTS

| | | | |
|---|---|---|---|
| 2,451,327 | 10/48 | Fasce et al. | 260—681.5 |
| 2,554,908 | 5/51 | Hirschler | 260—681.5 |
| 2,882,244 | 4/59 | Milton | 252—455 |
| 2,900,430 | 8/59 | Henke et al. | 260—681.5 |
| 3,106,593 | 10/63 | Benesi et al. | 260—681.5 |

OTHER REFERENCES

Jones, "Advances in Petroleum Chemistry and Refining," vol. IV, pp. 115–119, published by Interscience Publishers, Inc., New York (1961).

PAUL M. COUGHLAN, *Primary Examiner.*
ALPHONSO D. SULLIVAN, *Examiner.*